(12) United States Patent
Naing et al.

(10) Patent No.: US 10,812,731 B2
(45) Date of Patent: Oct. 20, 2020

(54) ADJUSTABLE RECEIVER EXPOSURE TIMES FOR ACTIVE DEPTH SENSING SYSTEMS

(71) Applicant: QUALCOMM Incorporated, San Diego, CA (US)

(72) Inventors: Htet Naing, San Diego, CA (US); Kalin Atanassov, San Diego, CA (US); Stephen Michael Verrall, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/108,882

(22) Filed: Aug. 22, 2018

(65) Prior Publication Data

US 2020/0068111 A1 Feb. 27, 2020

(51) Int. Cl.
*H04N 5/235* (2006.01)
*G01S 17/48* (2006.01)

(52) U.S. Cl.
CPC .......... *H04N 5/2353* (2013.01); *G01S 17/48* (2013.01); *H04N 5/2351* (2013.01)

(58) Field of Classification Search
CPC combination set(s) only.
See application file for complete search history.

(56) References Cited

U.S. PATENT DOCUMENTS

| | | | |
|---|---|---|---|
| 9,561,622 B2 | 2/2017 | Das et al. | |
| 9,769,461 B2 | 9/2017 | Appia et al. | |
| 2006/0062557 A1* | 3/2006 | Imada | H04N 5/23209 396/55 |
| 2014/0132721 A1 | 5/2014 | Martinez et al. | |
| 2014/0241614 A1 | 8/2014 | Lee | |
| 2015/0003684 A1 | 1/2015 | Appia | |
| 2016/0157723 A1 | 6/2016 | Kanick et al. | |
| 2018/0045513 A1* | 2/2018 | Kitamura | G01C 3/06 |

OTHER PUBLICATIONS

Bin Z., et al., "High Dynamic Range Saturation Intelligence Avoidance for Three-Dimensional Shape Measurement", 2015 15th IEEE/ACM International Symposium on Cluster, Cloud and Grid Computing, IEEE, May 4, 2015 (May 4, 2015), pp. 981-990, XP033171880, 10 Pages, DOI:10.1109/CCGRID.2015.100 [retrieved on Jul. 7, 2015].
International Search Report and Written Opinion—PCT/US2019/045871—ISA/EPO—dated Oct. 22, 2019.

* cited by examiner

*Primary Examiner* — Paul M Berardesca
(74) *Attorney, Agent, or Firm* — Qualcomm Incorporated

(57) ABSTRACT

Aspects of the present disclosure relate to active depth sensing. An example device may include a memory and a processor coupled to the memory. The processor may be configured to determine an amount of ambient light for a scene to be captured by a structured light receiver and adjust an exposure time for frame capture of a sensor of the structured light receiver based on the determined amount of ambient light. The exposure time of the sensor of the structured light receiver is inversely related to the determined amount of ambient light. The processor further may be configured to receive a plurality of captured frames from the structured light receiver based on the adjusted exposure time and generate an aggregated frame, including aggregating values across the plurality of captured frames.

25 Claims, 11 Drawing Sheets

600 ⤵

| Determine an amount of ambient light for the scene to be captured by the structured light receiver. 602 |

| Adjust the exposure time of the structured light receiver sensor for one or more frame captures based on the amount of ambient light, wherein the exposure time is inversely related to the amount of ambient light. 604 |

| Receive a plurality of captured frames from the structured light receiver based on the adjusted exposure time. 652 |

| Aggregate values across the plurality of captured frames. 654 |

FIG. 6B

ADJUSTABLE RECEIVER EXPOSURE TIMES FOR ACTIVE DEPTH SENSING SYSTEMS

TECHNICAL FIELD

This disclosure relates generally to active depth sensing systems and methods, and specifically to adjustable exposure times or frame capture rates for active depth sensing systems.

BACKGROUND

A device may determine depths or distances of its surroundings using different active depth sensing systems. In determining depths or distances of objects from the device, the device may transmit one or more wireless signals and measure reflections of the wireless signals. The device may then use the reflections to generate a depth map illustrating or otherwise indicating the depths of objects from the device. One depth sensing system is a structured light system that transmits a known distribution of light.

For example, a structured light system may transmit light in a known distribution or pattern of points. The light may be near-infrared (NIR) signals or other frequency signals of the electromagnetic spectrum. The reflections of the transmitted light may be captured, and the captured signals may be processed in determining depths of objects from the structured light system. Constraints on the resolution and the transmission power of the transmitted distribution for conventional structured light systems limit the accuracy and effective operation for active depth sensing.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to active depth sensing. An example device may include a memory and a processor. The processor may be configured to determine an amount of ambient light for a scene to be captured by a structured light receiver and adjust an exposure time for frame capture of a sensor of the structured light receiver based on the determined amount of ambient light. The exposure time of the sensor of the structured light receiver is inversely related to the determined amount of ambient light. The processor further may be configured to receive a plurality of captured frames from the structured light receiver based on the adjusted exposure time and generate an aggregated frame, including aggregating values across the plurality of captured frames.

In another example, a method is disclosed. The example method may include determining an amount of ambient light for a scene to be captured by a structured light receiver and adjusting an exposure time for frame capture of a sensor of the structured light receiver based on the determined amount of ambient light. The exposure time of the sensor of the structured light receiver is inversely related to the determined amount of ambient light. The method further may include receiving a plurality of captured frames from the structured light receiver based on the adjusted exposure time and generating an aggregated frame, including aggregating values across the plurality of captured frames.

In a further example, a non-transitory computer-readable medium is disclosed. The non-transitory computer-readable medium may store instructions that, when executed by one or more processors, cause a device to determine an amount of ambient light for a scene to be captured by a structured light receiver and adjust an exposure time for frame capture of a sensor of the structured light receiver based on the determined amount of ambient light. The exposure time of the sensor of the structured light receiver is inversely related to the determined amount of ambient light. The instructions further may cause the device to receive a plurality of captured frames from the structured light receiver based on the adjusted exposure time and generate an aggregated frame, including aggregating values across the plurality of captured frames.

In another example, a device is disclosed. The device includes means for determining an amount of ambient light for a scene to be captured by a structured light receiver and means for adjusting an exposure time for frame capture of a sensor of the structured light receiver based on the determined amount of ambient light. The exposure time of the sensor of the structured light receiver is inversely related to the determined amount of ambient light. The device further includes means for receiving a plurality of captured frames from the structured light receiver based on the adjusted exposure time and means for generating an aggregated frame configured to aggregate values across the plurality of captured frames.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 6A is an illustrative flow chart depicting an example operation for adjusting an exposure time for frame capture of a structured light receiver sensor.

FIG. 6B is an illustrative flow chart depicting an example operation for generating an aggregated frame.

DETAILED DESCRIPTION

Aspects of the present disclosure relate to active depth sensing systems. A structured light system may transmit light in a predefined distribution of points (or another suitable shape of focused light, such as lines, arcs, etc.). The points of light may be projected on to a scene, and the reflections of the points of light may be received by the structured light system. Depths of objects in a scene may be determined by comparing the pattern of the received light and the pattern of the transmitted light. In comparing the patterns, a portion of the predefined distribution for the transmitted light may be identified in the received light.

Figure 1:
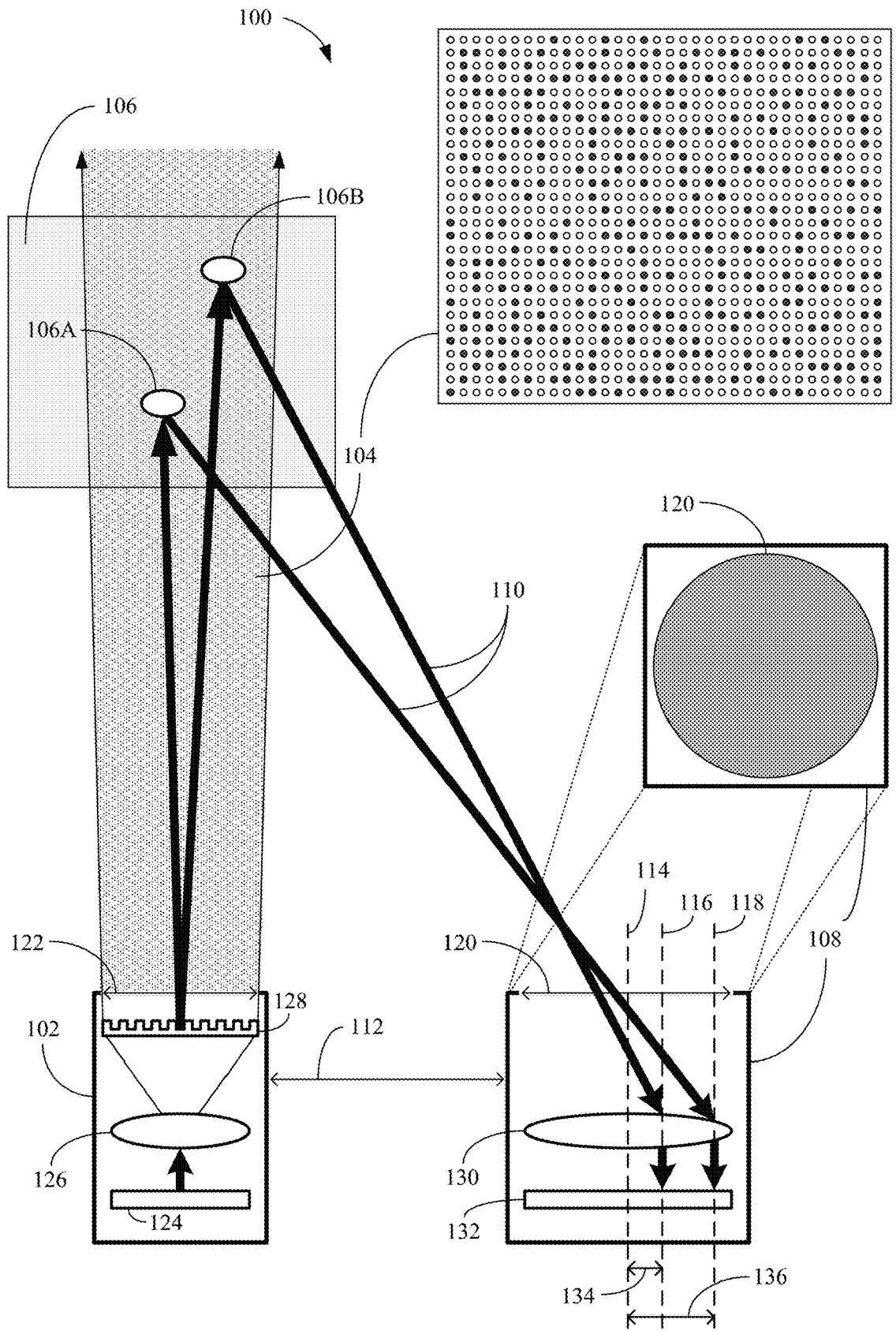
FIG. 1 is a depiction of an example structured light system.

FIG. 1 is a depiction of an example structured light system 100. The structured light system 100 may be used in generating a depth map (not pictured) or otherwise determining depths of objects in a scene 106. The structured light system 100 may include at least a projector or transmitter 102 and a receiver 108. The projector or transmitter 102 may be referred to as a "transmitter," "projector," "emitter," and so on, and should not be limited to a specific transmission component. Similarly, the receiver 108 may also be referred to as a "detector," "sensor," "sensing element," "photodetector," and so on, and should not be limited to a specific receiving component.

The transmitter 102 may be configured to project a codeword distribution 104 of light points (or other suitable distribution and type of focused light) onto the scene 106. In some example implementations, the transmitter 102 may include one or more laser sources 124, a lens 126, and a light modulator 128. The transmitter 102 also may include an aperture 122 from which the transmitted light escapes the transmitter 102. In some implementations, the transmitter 102 further may include a diffractive optical element (DOE) to diffract the emissions from one or more laser sources 124 into additional emissions. In some aspects, the light modulator 128 (to adjust the intensity of the emission) may comprise a DOE. The codeword distribution 104 may be hardcoded on the structured light system 100 (e.g., at the transmitter 102) so that the pattern and other characteristics of the codeword distribution 104 do not vary. In projecting the codeword distribution 104 of light points onto the scene 106, the transmitter 102 may transmit one or more lasers from the laser source 124 through the lens 126 (and/or through a DOE or light modulator 128) and onto the scene 106. The transmitter 102 may be positioned on the same reference plane as the receiver 108, and the transmitter 102 and the receiver 108 may be separated by a distance called the baseline (112).

The scene 106 may include objects at different depths from the structured light system (such as from the transmitter 102 and the receiver 108). For example, objects 106A and 106B in the scene 106 may be at different depths. The receiver 108 may be configured to receive, from the scene 106, reflections 110 of the transmitted codeword distribution 104 of light points. To receive the reflections 110, the receiver 108 may capture an image frame (frame). When capturing the frame, the receiver 108 may receive the reflections 110, as well as (i) other reflections of the codeword distribution 104 of light points from other portions of the scene 106 at different depths and (ii) ambient light. Noise also may exist in the captured frame.

In some example implementations, the receiver 108 may include a lens 130 to focus or direct the received light (including the reflections 110 from the objects 106A and 106B) on to the sensor 132 of the receiver 108. The receiver 108 also may include an aperture 120 to restrict the direction from which the receiver 108 may receive light. Assuming for the example that only the reflections 110 are received, depths of the objects 106A and 106B may be determined based on the baseline 112, displacement and distortion of the codeword distribution 104 in the reflections 110, and intensities of the reflections 110. For example, the distance 134 along the sensor 132 from location 116 to the center 114 may be used in determining a depth of the object 106B in the scene 106. Similarly, the distance 136 along the sensor 132 from location 118 to the center 114 may be used in determining a depth of the object 106A in the scene 106. The distance along the sensor 132 may be measured in terms of number of pixels of the sensor 132 or a distance (such as millimeters).

In some example implementations, the sensor 132 may include an array of photodiodes (such as avalanche photodiodes) for capturing an image. To capture the image, each photodiode in the array may capture the light that hits the photodiode and may provide a value indicating the intensity of the light (a capture value). The frame therefore may be the capture values provided by the array of photodiodes.

In addition or alternative to the sensor 132 including an array of photodiodes, the sensor 132 may include a complementary metal-oxide semiconductor (CMOS) sensor or other suitable type of sensor. To capture the image by a photosensitive CMOS sensor, each pixel of the sensor may capture the light that hits the pixel and may provide a value indicating the intensity of the light. In some examples, the light intensity may be indicated in terms of luminance, lumens, lumens per square meter (lux), or other suitable measurement of light intensity. In some example implementations, an array of photodiodes may be coupled to the CMOS sensor. In this manner, the electrical impulses generated by the array of photodiodes may trigger the corresponding pixels of the CMOS sensor to provide capture values for a frame.

The sensor 132 may include at least a number of pixels equal to the number of light points in the codeword distribution 104. For example, the array of photodiodes or the CMOS sensor may include at least a number of photodiodes or a number of pixels, respectively, corresponding to the number of light points in the codeword distribution 104. The sensor 132 logically may be divided into groups of pixels or photodiodes that correspond to a size of a bit of the codeword distribution if the transmitted distribution is logically divided into codewords. The group of pixels or photodiodes also may be referred to as a bit, and the portion of the captured frame from a bit of the sensor 132 also may be referred to as a bit. In some example implementations, the sensor 132 may include the same number of bits as the codeword distribution 104.

As illustrated, the distance 134 (corresponding to the reflections 110 from the object 106B) is less than the distance 136 (corresponding to the reflections 110 from the object 106A). Using triangulation based on the baseline 112 and the distances 134 and 136, the differing depths of objects 106A and 106B in the scene 106 may be determined. However, in order to be able to determine the distance 134 and the distance 136, the portion of the codeword distribution 104 in the reflections 110 needs to be identified. If a sufficient number of points in the codeword distribution 104 are not recognized in the portions of codeword distribution 104 included in the reflections 110, the portions of the codeword distribution 104 in the reflections may not be identified. For example, the amount of ambient light received when capturing the frame by the receiver 108 may obfuscate the codeword distribution 104 in the reflections 110.

A structured light transmitter may include one or more laser diodes to transmit light with a wavelength of 825 nanometers (nm) or 940 nm (or another suitable wavelength in the NIR spectrum). As stated above, a structured light receiver may capture reflections of the light distribution transmitted by the structured light transmitter and ambient light not associated with the transmitted light distribution. The captured frame also may include noise.

Figure 2:
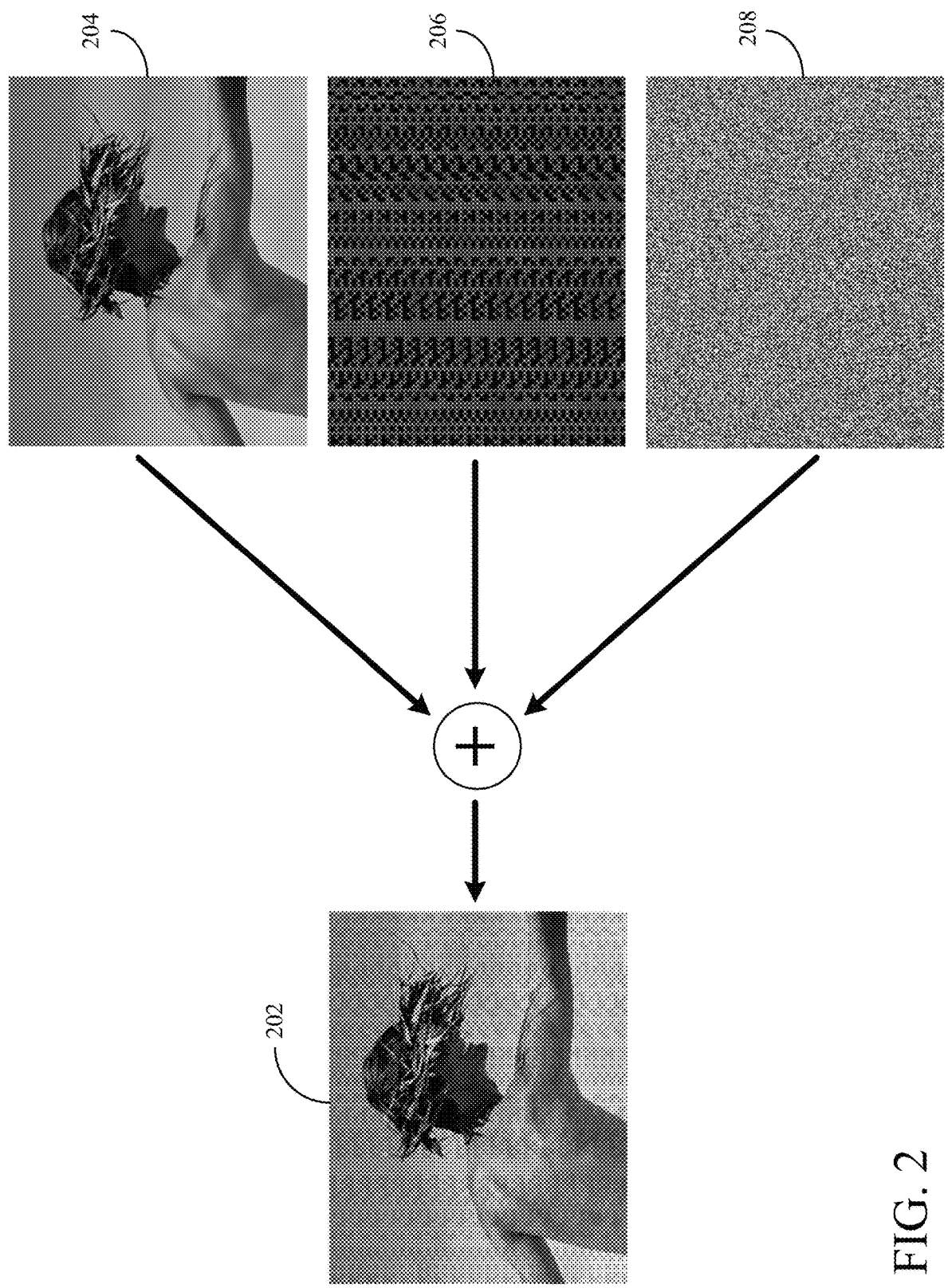
FIG. 2 is a depiction of an example captured frame including light from the scene, the light distribution, and noise.
Figure 3:
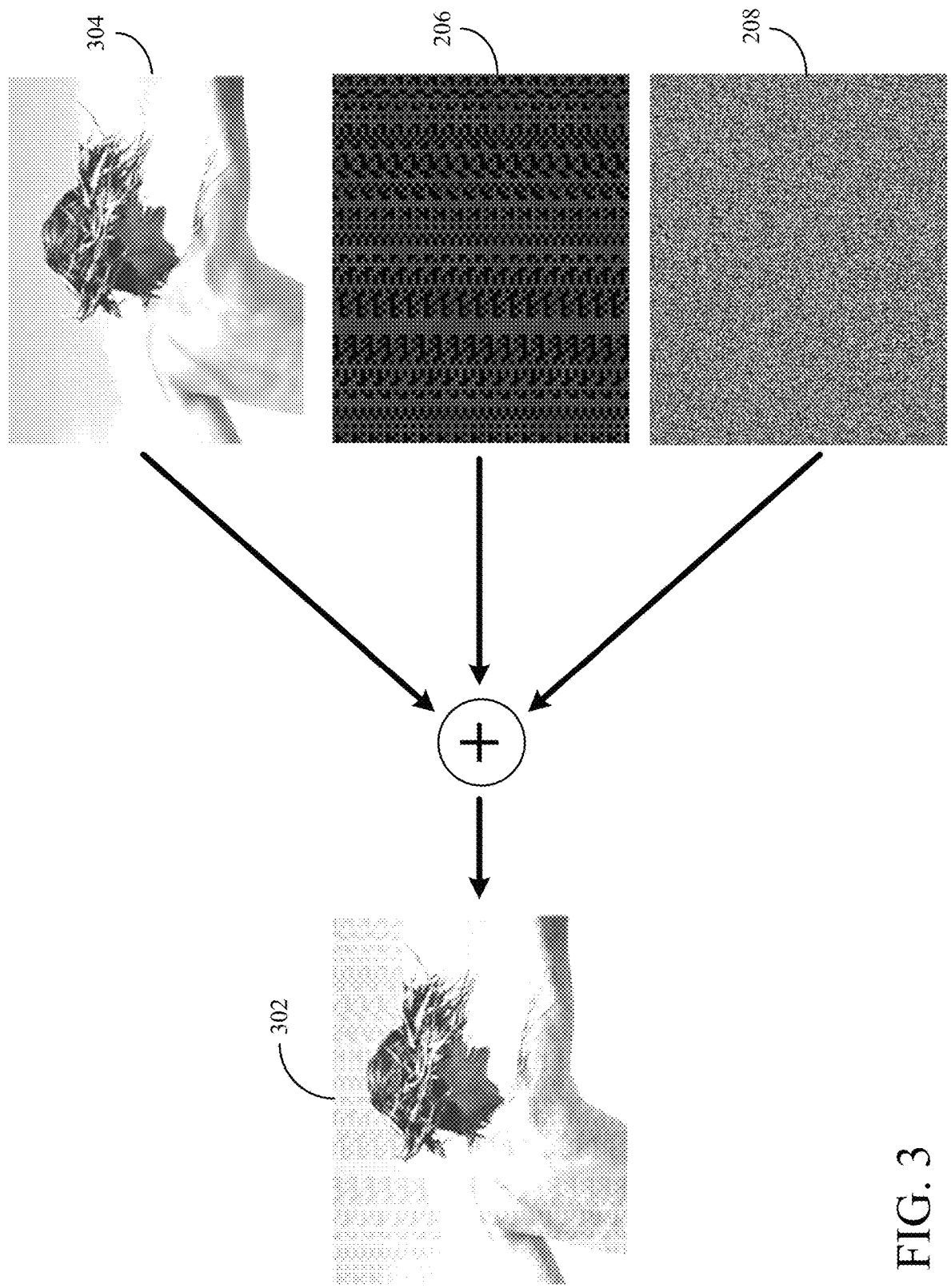
FIG. 3 is a depiction of an example captured frame including light from the scene greater than the light from the scene in FIG. 2, the same example reflection of the light distribution from FIG. 2, and the same example noise from FIG. 2.

FIG. 2 is a depiction of an example captured frame 202 including light from the scene 204, an example reflection of the light distribution 206, and an example noise 208. If the intensity of the light from the scene 204 (ambient light) increases, the light distribution 206 may be more difficult to identify in the frame 202. FIG. 3 is a depiction of an example captured frame 302 including light from the scene 304, the example reflection of the light distribution 206 (from FIG. 2), and the example noise 208 (from FIG. 2). The intensity of the light in the scene 304 is greater than the intensity of the light in the scene 204. As a result, portions of the light distribution 206 in the frame 302 may be more difficult to identify.

The amount of ambient light may affect the ability to determine depths using a structured light system, and a structured light system may be more effective in low light scenarios (such as indoors or at nighttime) than in bright light scenarios (such as outdoors during sunny days). A device may compensate for ambient light by including a light filter in the structured light receiver. Referring back to FIG. 1, if the transmitter 102 transmits light with a 940 nm wavelength, the receiver 108 may include a filter before the lens 130 that blocks light with a wavelength outside of a range around 940 nm. For example, the filter may block light with a wavelength outside of an example range of 800 nm to 1100 nm. However, ambient light still exists within the range of wavelengths that may interfere with operation of the structured light system.

Additionally or alternatively, a device may compensate for ambient light by adjusting the exposure time of the structured light receiver sensor. Referring back to FIG. 1, the amount of time that each pixel of the sensor 132 receives light for a frame capture may be adjustable. If the exposure time is increased, the amount of light received by a pixel during the exposure time for a frame capture increases (and the measured overall light intensity for the pixel increases).

Figure 4A:
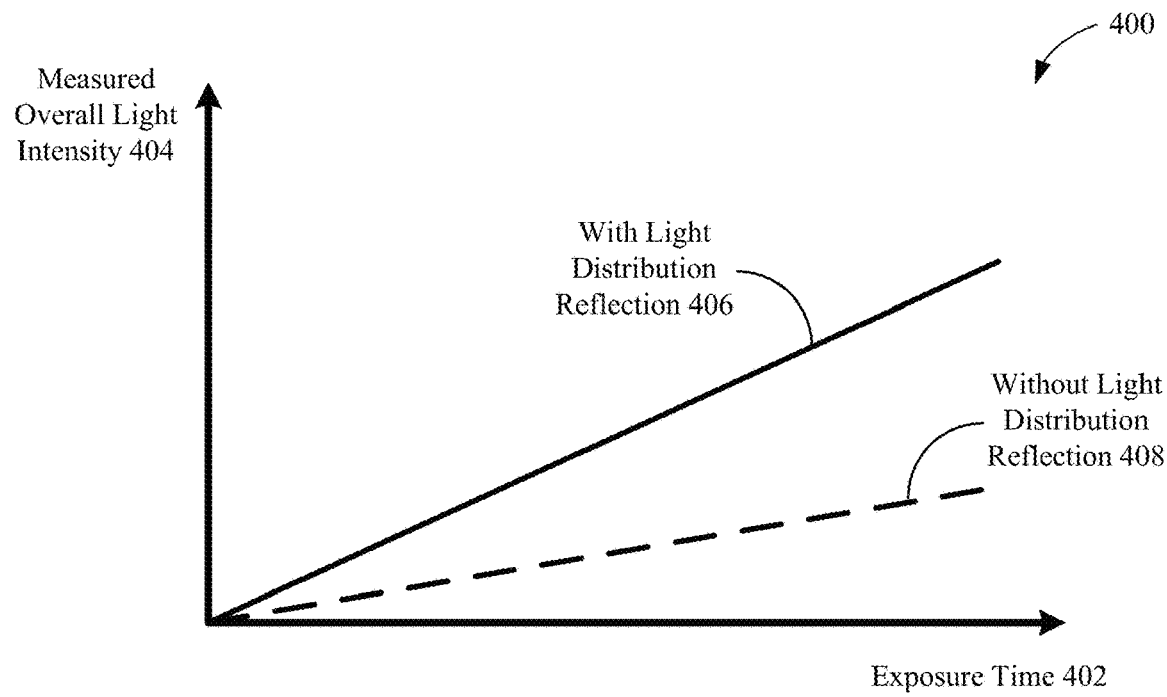
FIG. 4A is a depiction of an example graph illustrating measured overall light intensity in relation to exposure time for a pixel.

FIG. 4A is a depiction of an example graph 400 illustrating measured overall light intensity 404 in relation to exposure time 402 for a pixel. The overall light intensity the pixel measures increases more quickly in relation to the exposure time if the light includes light from the light distribution reflection (406) than if the light does not include light from the light distribution reflection (408). The measured overall light intensity without a light distribution reflection may be from the ambient light. The slope of lines 406 and 408 may increase as the amount of ambient light increases.

For depth sensing, the difference in overall measured light intensity with and without the light distribution reflection may be used to determine whether light of the reflected light distribution is received at the pixel. For example, a device may use an intensity threshold to determine if a light point exists at the pixel. The intensity threshold for an exposure time may be between the light intensity value without a light distribution reflection and the light intensity value with a light distribution reflection (such as between lines 408 and 406). In this manner, the device may determine that a light point of the light distribution reflection is received at the pixel when the measured overall light intensity is greater than the intensity threshold, and the device may determine that a light point of the light distribution reflection is not received at the pixel when the measured overall light intensity is less than the intensity threshold. The threshold may be based on the exposure time for the pixel.

The difference between the measured overall light intensity with and without the light distribution reflection may need to be sufficiently large for a device to accurately identify a light point at the pixel using the intensity threshold. In this manner, the structured light receiver may be configured to have a minimum exposure time or a fixed exposure time.

Figure 4B:
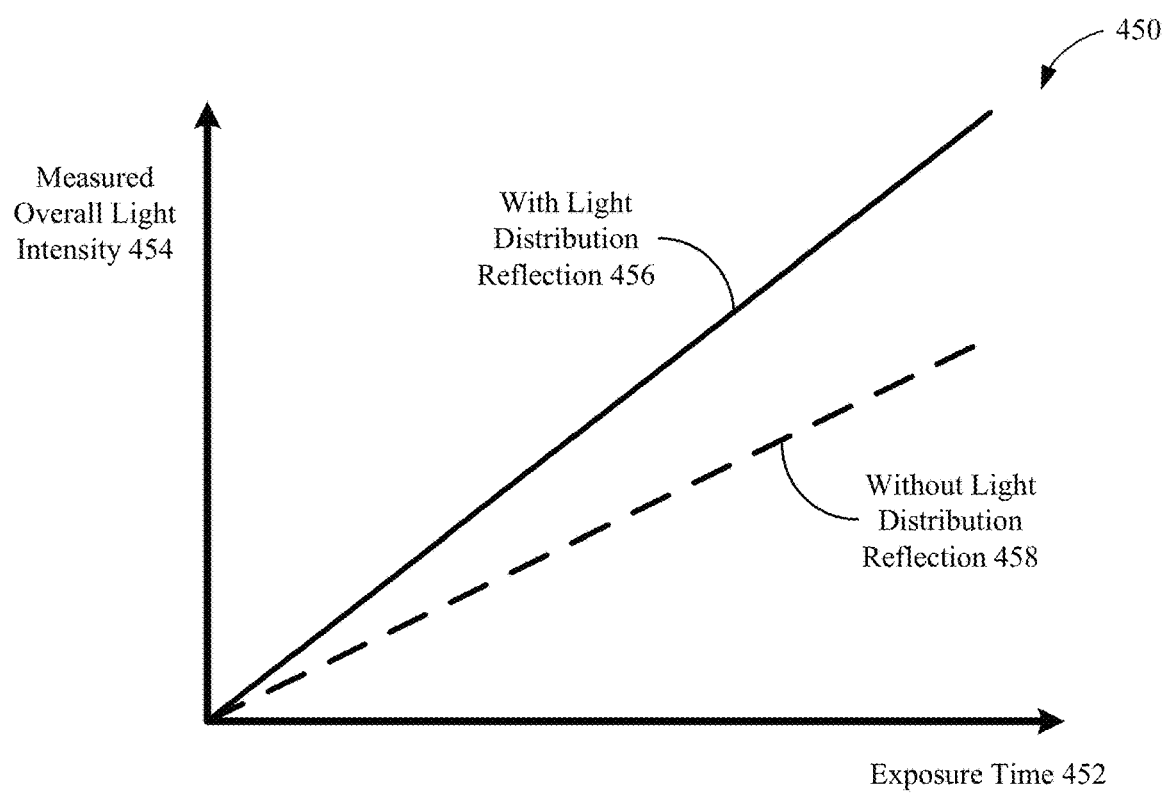
FIG. 4B is a depiction of an example graph illustrating measured overall light intensity in relation to exposure time for a pixel when more ambient light exists than for the graph in FIG. 4A.

Since the measured overall light intensity 404 without a light distribution reflection (408) may be from ambient light, the slope of lines 406 and 408 may increase as the amount of ambient light increases. The difference in overall measured light intensity 404 between the two lines 406 and 408 may remain the same as the amount of ambient light increases. FIG. 4B is a depiction of an example graph 450 illustrating measured overall light intensity 454 in relation to exposure time 452 for a pixel when more ambient light exists than for the graph 400 in FIG. 4A. As shown, the slope of the line 456 is greater than the slope of the line 406 (in FIG. 4A), and the slope of the line 458 is greater than the slope of the line 408 (in FIG. 4A). The difference between the measured overall light intensity 454 with and without the light distribution reflection (456 and 458, respectively) and the difference between the measured overall light intensity 404 (in FIG. 4A) with and without the light distribution reflection (406 and 408, respectively, in FIG. 4B) may be approximately the same for the same exposure time. The magnitude of the measured overall light intensity 454, though, is greater than the magnitude of the measured overall light intensity 404 in FIG. 4A for the same exposure time.

For the measured overall light intensity for a pixel, the light distribution reflection intensity portion reduces in relation to the ambient light intensity portion as the ambient light increases. As a result, increased ambient light may cause the device to have more difficulty in identifying whether a light point exists at the pixel, and the device may make more errors in determining where light from the light distribution is received at the structured light receiver sensor.

A device may attempt to compensate for an increase in ambient light by increasing the transmission power for the structured light transmitter. In this manner, the intensity of the light transmission may be increased, thus increasing the intensity of the reflections received by the structured light receiver. However, eye safety concerns and various regulations may limit the intensity of the structured light transmissions. Further, increased transmission power requires additional power, which may be undesirable for power constrained devices (such as battery powered devices, including smartphones, tablets, and other handheld devices).

In addition or alternative to increasing the transmission power for the structured light transmitter, the exposure time for the structured light receiver sensor when capturing a frame may be increased when the ambient light increases.

However, each sensor pixel or photodiode may be able to measure a defined range of light intensities. If the exposure time is increased, the overall intensity of the light received by a pixel over the exposure time increases. As a result, the pixel (such as a photodiode or CMOS sensor pixel) may become saturated (reaching the upper limit of the range of intensities able to be measured for the pixel) before reaching the end of the exposure time. In addition, the ambient light may be significant enough to saturate pixels of the structured light receiver sensor even when the exposure time is fixed. For example, depth sensing using a structured light system in bright daylight may be ineffective as a result of the amount of ambient light. The device may not receive an accurate measurement of the overall intensity, and the device is unable to determine whether light from the light distribution is received at the pixel.

For frames captured with scenes having more ambient light, the device may use larger codewords to identify portions of the light distribution in the frame. The light distribution logically may be divided into a plurality of portions (such as codewords). The codewords may be larger (include more points of light) to increase the probability of identifying a codeword in the frame. Alternatively, the codewords may be smaller (include less points of light) to increase the number of depths that may be determined for the scene (to increase resolution). Smaller codewords are considered finer scale codewords than larger codewords (coarser scale codewords). When the measured light intensities from the captured frame are compared to the predefined light distribution transmitted by the structured light transmitter, codewords of one size or scale are attempted to be identified in the received light. The size of the codewords causes a trade-off between reliably identifying portions of the light distribution by using coarser scale codewords and increasing the resolution by using finer scale codewords. Since larger codewords include more light points than smaller codewords, more tolerance for errors in identifying light points in the frame exists when identifying larger codewords than when identifying smaller codewords. However, the resolution decreases as the size of the codewords increase. Further, the ambient light may be significant enough that even the largest codewords for the light distribution are not identifiable. For example, a significant portion of the structured light receiver sensor may be saturated when capturing a frame, thus preventing any size codewords from being identified in the saturated portions of the frame.

In some aspects of the present disclosure, a sensor exposure time or the frame capture rate for a structured light receiver may be adjustable. In some example implementations, a device may increase the frame capture rate, thus reducing the exposure time for the sensor when the amount of ambient light increases. For example, the structured light receiver may have a higher frame capture rate (thus shortening the exposure time of the sensor for each frame capture) when the structured light system is used in bright daylight than when used indoors or during nighttime. If the frame capture rate for the structured light receiver is increased (thus decreasing the exposure time per frame capture), the device may aggregate the measured overall light intensities across multiple frames. For example, the device may generate an aggregated frame with aggregated light intensity measurements across multiple frames. In this manner, the device may increase in the aggregated frame the difference between measured overall light intensities with and without the light distribution, and individual frames of the aggregate frame may include a short enough exposure time to prevent saturating portions of the structured light receiver sensor. In some example implementations, a device may measure the amount of ambient light to determine when and/or how much to increase the frame capture rate. In some examples, the increased frame capture rate may be an integer multiple of a base frame capture rate for the structured light receiver. In some further examples, the frame captures at an increased rate of the structured light receiver (which may include a NIR sensor) may be synchronized with frame captures from a camera sensor (such as an RGB sensor).

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processes, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Also, the example devices may include components other than those shown, including well-known components such as a processor, memory and the like.

Aspects of the present disclosure are applicable to any suitable electronic device (such as security systems, smartphones, tablets, laptop computers, vehicles, drones, or other devices) including or coupled to one or more structured light systems. While described below with respect to a device having or coupled to one structured light system, aspects of the present disclosure are applicable to devices having any number of structured light systems, and are therefore not limited to specific devices.

The term "device" is not limited to one or a specific number of physical objects (such as one smartphone, one controller, one processing system, etc.). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific embodiments. For example, a system may be implemented on one or more printed circuit boards or other substrates, and may have movable or static components. While the below description and examples use the term "system" to describe various aspects of this disclosure, the term "system" is not limited to a specific configuration, type, or number of objects.

Figure 5:
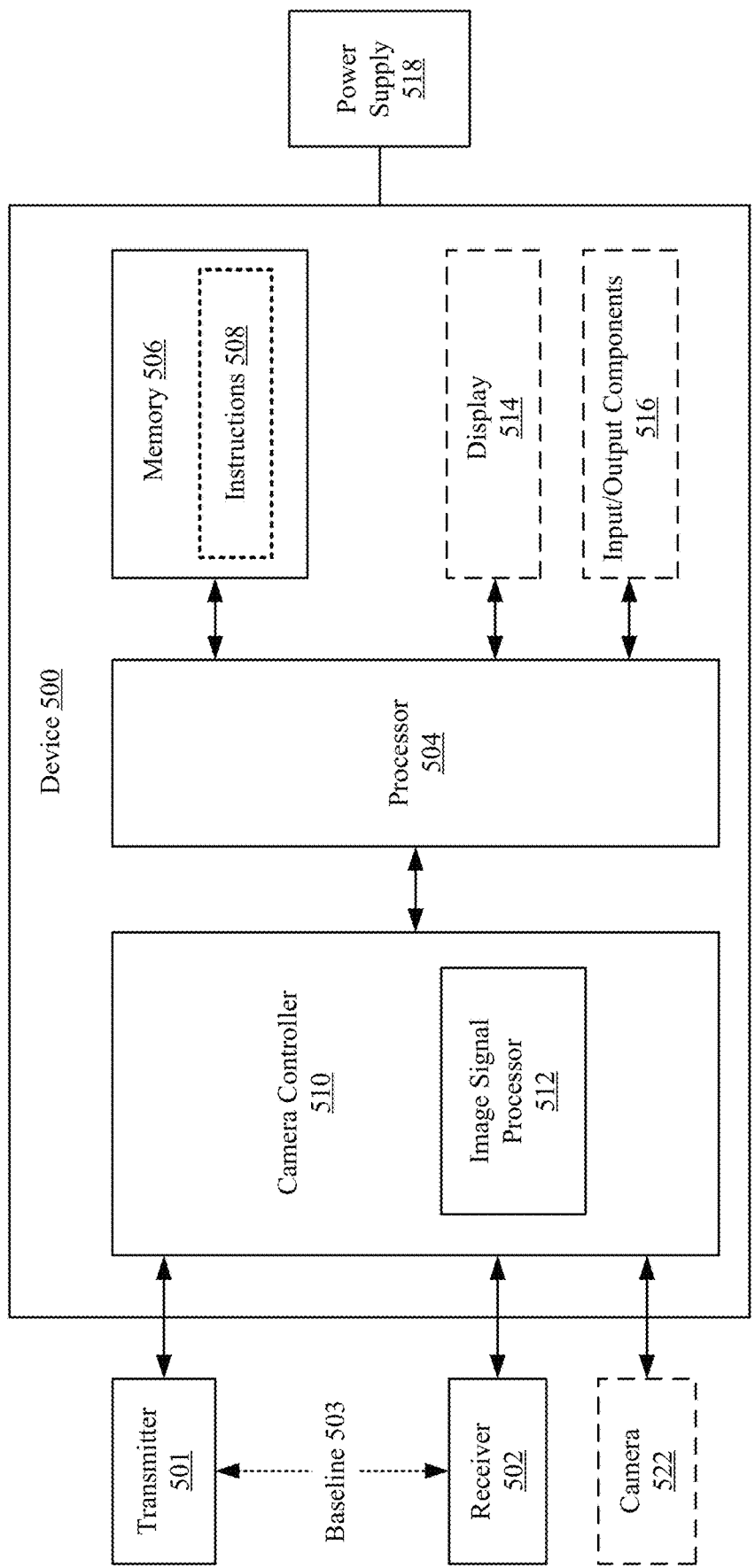
FIG. 5 is a block diagram of an example device including a structured light system.

FIG. 5 is a block diagram of an example device 500 including a structured light system (such as the structured light system 100 in FIG. 1). In some other examples, the structured light system may be coupled to the device 500. The example device 500 may include or be coupled to a transmitter 501 (such as transmitter 102 in FIG. 1) and a receiver 502 (such as receiver 108 in FIG. 1). The transmitter 501 and the receiver 502 may be separated by a baseline 503. The example device 500 also may include a processor 504, a memory 506 storing instructions 508, and a camera controller 510 (which may include one or more image signal processors 512). The device 500 optionally may include (or be coupled to) a display 514, a number of input/output (I/O) components 516, and a camera 522. The device 500 may include additional features or components not shown. For example, a wireless interface, which may include a number of transceivers and a baseband processor, may be included for a wireless communication device.

The transmitter 501 and the receiver 502 may be part of a structured light system (such as the structured light system 100 in FIG. 1) controlled by the camera controller 510 and/or the processor 504. The device 500 may include or be coupled to additional structured light systems or may include a different configuration for the structured light system. For example, the device 500 may include or be coupled to additional receivers (not shown) for capturing multiple frames of a scene at different perspectives. The disclosure should not be limited to any specific examples or illustrations, including the example device 500.

The transmitter 501 may be configured to transmit a distribution of light in the NIR range. For example, the transmitter 501 may include a laser to transmit light with a wavelength of 825 nm or 940 nm. The receiver 502 may include a NIR sensor for capturing frames. The receiver 502 may have a base exposure time for frame capture or may have a base frame capture rate, and the exposure time and/or the frame capture rate may be adjustable (such as increased from a base frame capture rate).

The memory 506 may be a non-transient or non-transitory computer readable medium storing computer-executable instructions 508 to perform all or a portion of one or more operations described in this disclosure. The device 500 also may include a power supply 518, which may be coupled to or integrated into the device 500.

The processor 504 may be one or more suitable processors capable of executing scripts or instructions of one or more software programs (such as instructions 508) stored within the memory 506. In some aspects, the processor 504 may be one or more general purpose processors that execute instructions 508 to cause the device 500 to perform any number of functions or operations. In additional or alternative aspects, the processor 504 may include integrated circuits or other hardware to perform functions or operations without the use of software. While shown to be coupled to each other via the processor 504 in the example of FIG. 5, the processor 504, the memory 506, the camera controller 510, the optional display 514, and the optional I/O components 516 may be coupled to one another in various arrangements. For example, the processor 504, the memory 506, the camera controller 510, the optional display 514, and/or the optional I/O components 516 may be coupled to each other via one or more local buses (not shown for simplicity).

The display 514 may be any suitable display or screen allowing for user interaction and/or to present items (such as a depth map or a preview image of the scene) for viewing by a user. In some aspects, the display 514 may be a touch-sensitive display. The I/O components 516 may be or include any suitable mechanism, interface, or device to receive input (such as commands) from the user and to provide output to the user. For example, the I/O components 516 may include (but are not limited to) a graphical user interface, keyboard, mouse, microphone and speakers, squeezable bezel or border of the device 500, physical buttons located on device 500, and so on. The display 514 and the I/O components 516 may provide a preview image or depth map of the scene to a user and/or receive a user input for adjusting one or more settings of the device 500 (such as adjusting the intensity of the emissions by transmitter 501, adjusting the scale of the codewords used for determining depths, adjusting the frame capture rate of the receiver 502, and so on).

The camera controller 510 may include an image signal processor 512, which may be one or more processors to process the frames captured by the receiver 502. The image signal processor 512 also may control the transmitter 501 (such as control the transmission power) and control the receiver 502 (such as control the frame capture rate or control the exposure time for a frame capture). In some aspects, the image signal processor 512 may execute instructions from a memory (such as instructions 508 from the memory 506 or instructions stored in a separate memory coupled to the image signal processor 512). In other aspects, the image signal processor 512 may include specific hardware for operation. The image signal processor 512 may alternatively or additionally include a combination of specific hardware and the ability to execute software instructions.

If the device 500 includes the optional camera 522, the camera controller 510 (such as the image signal processor 512) may control the camera 522 and process image frames captured by the camera 522. In some alternative example implementations of the device 500, the processor 504 or another suitable device component may be configured to control the camera 522 and/or process image frames captured by the camera 522. For example, a separate camera controller (not shown) may include one or more image signal processors to process the image frames and control the camera 522.

The camera 522 may be oriented to have approximately the same field of capture as the receiver 502. For example, a smartphone may include a camera 522 and a receiver 502 on the front side of the smartphone with the display 514, and the camera 522 and the receiver 502 may be oriented in the same direction. In some example implementations, the camera 522 includes an image sensor for capturing visible light (such as an RGB sensor).

The following examples are described in relation to the device 500 to explain some concepts in the present disclosure. However, other suitable devices may be used in performing aspects of the present disclosure, and the present disclosure should not be limited to a specific device or configuration of components, including device 500.

FIG. 6A is an illustrative flow chart depicting an example operation 600 for adjusting an exposure time for frame capture of a structured light receiver sensor (such as a sensor of the receiver 502 in FIG. 5). Beginning at 602, the device 500 may determine an amount of ambient light for the scene to be captured by the receiver 502. The device 500 then may adjust the exposure time of the sensor for the receiver 502 for one or more frame captures based on the amount of ambient light, wherein the exposure time is inversely related to the amount of ambient light (604). In this manner, the device 500 may reduce the exposure time when the ambient light increases, and may increase the exposure time when the ambient light decreases.

If the exposure time for frame capture is decreased, the difference between measurements (in a captured frame) with and without reflections of the light distribution from the transmitter 501 is smaller. For example, when the exposure time is decreased, a sensor pixel receiving reflected light from the light distribution from the transmitter 501 (such as light from a light point of the distribution) measures a smaller intensity difference from a sensor pixel not receiving reflected light from the light distribution. Referring back to FIGS. 4A and 4B, the difference between lines 406 and 408 or lines 456 and 458 decrease when moving left (reducing the exposure time 402 or 452) in the graph 400 or 450, respectively.

The device 500 may amplify the smaller differences in the measurements to identify which portions of a captured frame include reflections of the light distribution. In some example implementations, the device 500 may aggregate multiple captured frames into an aggregated frame to amplify the differences. FIG. 6B is an illustrative flow chart depicting an example operation 650 for generating an aggregated frame. Beginning at 652, the device 500 may receive a plurality of captured frames from the structured light receiver based on the adjusted exposure time. For example, if the device 500 decreases the exposure time for each frame capture based on an increase in ambient light (604 in FIG. 6A), the structured light receiver 502 may capture frames using the shortened exposure time, and the device 500 may receive the captured frames from the receiver 502.

The device 500 may aggregate values across the plurality of captured frames in generating the aggregated frame (654). For example, a pixel value at a corresponding location in the plurality of frames may be added across the plurality of frames. In this manner, the aggregated frame includes aggregated values across the plurality of frames for each pixel. As a result, the difference between measurements with and without light distribution reflections may be amplified for the device 500 to more easily identify the light distribution reflections. Other suitable processes for amplifying the difference in measurements may be used, and the present disclosure should not be limited to the examples in FIG. 6B. For example, the device may multiply the values in a captured frame by a constant value (thus logically aggregating multiple instances of the same captured frame. In another example, the captured frames may be sufficient without requiring aggregation.

Figure 7:
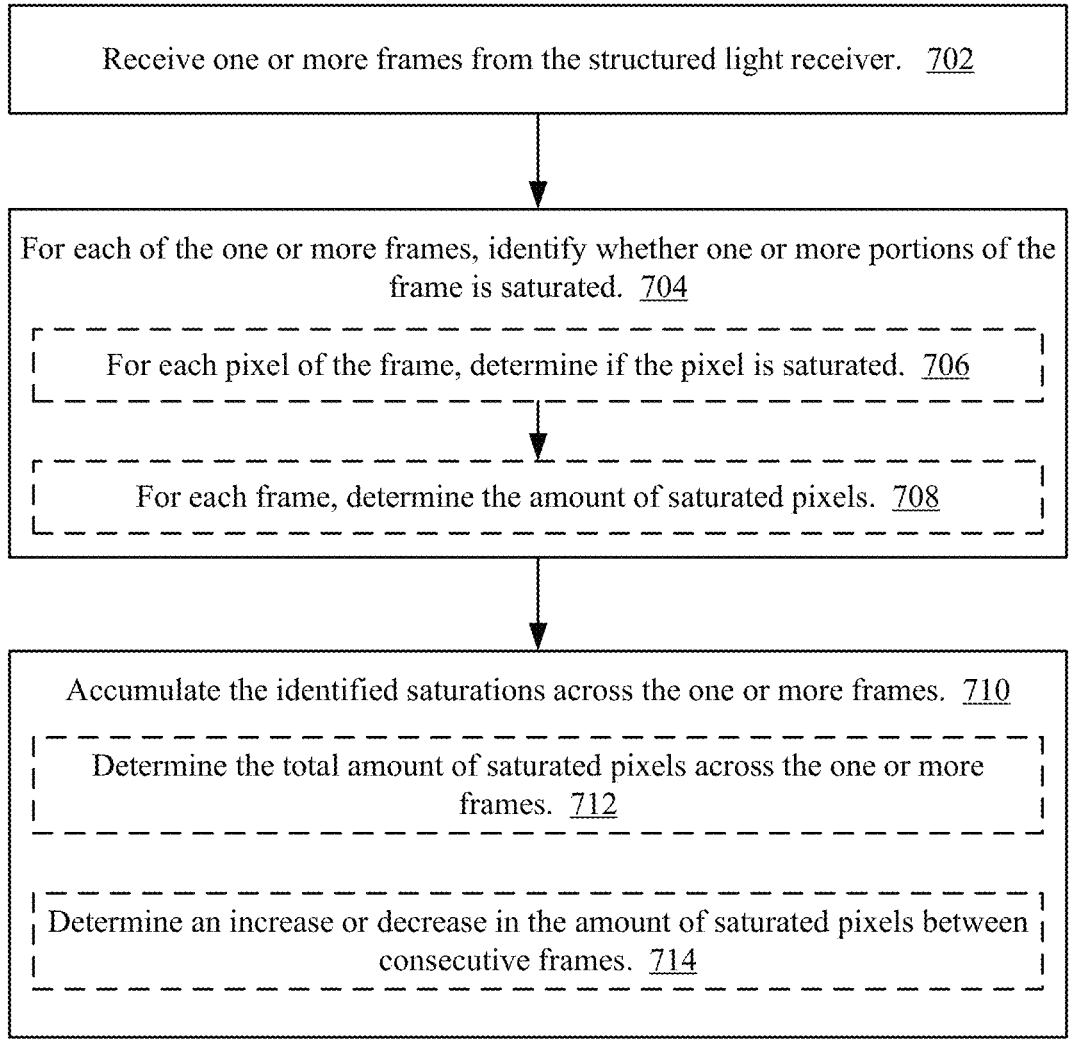
FIG. 7 is an illustrative flow chart depicting an example operation for determining a saturation of the receiver sensor for frame capture.

Referring back to FIG. 6A, in some example implementations of determining an amount of ambient light (602), the device 500 may determine if the ambient light saturates the receiver sensor based on one or more captured frames from the receiver 502. Additionally, the device 500 may determine the extent of the sensor saturation. FIG. 7 is an illustrative flow chart depicting an example operation 700 for determining a saturation of the receiver sensor for frame capture. Beginning at 702, the device 500 (such as the camera controller 510 or the image signal processor 512) may receive one or more frames from the receiver 502. The device 500 may identify, for each of the one or more frames, whether one or more portions of the frame are saturated (704). For example, the device 500 may determine, for each pixel of a frame, if the pixel is saturated (706). In one example, a pixel may be determined to be saturated if the pixel value in the frame is a maximum intensity value. In another example, a pixel may be determined to be saturated if the pixel has a maximum intensity value and a number of neighboring pixels have a maximum intensity value. As an illustrative example, if the frame values may be in a range from 0 to 256, the device 500 may determine that a pixel is saturated if the pixel value (and optionally a number of neighboring pixel values) is 256. The device 500 may determine an amount of saturated pixels for each frame (708). In one example, the device 500 may determine the number of saturated pixels for the frame. Additionally or alternatively, the device 500 may determine the proportion of saturated pixels to total pixels of the frame.

Proceeding to 710, the device 500 may accumulate the identified saturations across the one or more frames. In one example, the device 500 may determine the total amount of saturated pixels across the one or more frames (712). For example, the device 500 may determine the total number of instances of pixel saturation across the one or more frames. Additionally or alternatively, the device 500 may determine a combined proportion of saturated pixels to total pixels across the one or more frames (such as a simple average proportion, median proportion, weighted average proportion, or other suitable proportion).

In some additional or alternative aspects to determining the total amount of saturated pixels, the device 500 may determine an increase or decrease in the amount of saturated pixels between consecutive frames (714). The device 500 may determine a change between consecutive frames in the total number of saturated pixels or the proportion of saturated pixels to total pixels. In some examples, the device 500 may determine a trend in changes between consecutive frames. As an illustrative example, if four frames are received (frame 1, frame 2, frame 3, and frame 4), and the device 500 determines that the changes between frames 1 and 2, frames 2 and 3, and frames 3 and 4 are an increase in saturation, the device 500 may determine a trending increase in saturation across frames. Additionally or alternatively, the device 500 may determine if the magnitude of the change is increasing or decreasing. For example, the device 500 may determine whether the increase or decrease in the amount of saturated pixels is accelerating or decelerating across a plurality of consecutive frames.

The device 500 may accumulate statistics regarding saturation in frames for one frame or for a plurality of frames. If accumulated for a plurality of frames, the device 500 may update the accumulations each time a frame is received. In some example implementations, the saturation statistics may be accumulated across a defined number of frames (such as 2, 3, 5, or other suitable number of frames). For example, the device 500 may include or be configured to buffer the amount of saturation of the last 5 frames from the receiver 502. When a new frame is received, and an amount of saturation is determined for the frame, the device 500 may remove the oldest buffered amount of saturation and buffer the amount of saturation for the new frame. In this manner, the accumulated identified saturations may be a moving window across a number of frames as the frames are received from the receiver 502. In some example implementations, the size of the window (e.g., the size of the buffer) may be fixed. In some other example implementations, the size of the window (e.g., the size of the buffer) may be adjustable. In one example, the device 500 may increase the window size when the variance in total amount of saturated pixels among frames increases, and the device 500 may decrease the window size when the variance in total amount of saturated pixels among the frames decreases.

While some examples of accumulating saturation statistics across one or more frames are described in relation to FIG. 7, any suitable accumulation of saturation statistics may be used. The present disclosure should not be limited to the above examples regarding FIG. 7.

In some further example implementations, the device 500 may accumulate other statistics in addition or alternative to saturation statistics. In one example, the device 500 may determine the average measured intensity for a frame (such as the average lumens or lux for the frame). The device 500 then may buffer a number of the average intensities and/or determine an overall average intensity across the frames. The exposure time may be inversely related to the average intensity. Similar to using saturation statistics, the device 500 may use one or more intensity thresholds to determine when and how much to adjust the exposure time.

In another example, the device 500 may determine the number of decoding errors that occur when processing a frame to identify one or more codewords of the light distribution. The device 500 may determine the number of decoding errors by determining the number of misidentified codewords or the portions of the frame for which a codeword is not identified. The device may determine a total number of decoding errors, an average or median number of decoding errors, or a trend in decoding errors across one or more frames. The number of decoding errors may be buffered for a number of frames. The exposure time may be inversely related to the number of decoding errors. The device 500 may use one or more decoding error thresholds to determine when and how much to adjust the exposure time.

In another example, the device 500 may determine the signal-to-noise ratio (SNR) for one or more frames. Ambient light may be considered noise. In this manner, the SNR is inversely related to the amount of ambient light. For example, frames captured indoors or during nighttime may have a higher SNR than frames captured during bright daylight. The device may determine an average SNR, median SNR, or a trend in SNR across one or more frames. The SNRs may be buffered for a number of frames. The device 500 may use one or more SNR thresholds to determine when and how much to adjust the exposure time.

Other suitable accumulation statistics may be used, and the present disclosure should not be limited to the provided examples. Further, the device 500 may use a combination of accumulation statistics in determining when and how much to adjust the exposure time. For example, the device 500 may use an intensity statistic and a decoding error statistic to determine when and how much to adjust the exposure time. The combination of accumulation statistics may be, e.g., a vote checker, where any of the statistics may cause the device 500 to determine when and how much to adjust the exposure time. Other suitable combinations of statistics may be used, and the present disclosure should not be limited to the provided examples.

Referring back to FIG. 6A for the above examples of accumulation statistics, the amount of ambient light may be determined by the device 500 (in 602) to be, e.g., at least one of a saturation statistic, an intensity statistic, a decoding error statistic, an SNR statistic, or other suitable statistic. In some example implementations of adjusting the exposure time of the receiver sensor for frame capture (in 604), the device 500 may determine when and the amount to adjust the exposure time based on the accumulated statistics.

The exposure time may be based on or corresponding with the frame capture rate of the receiver 502. For example, the device 500 may decrease the exposure time for a frame capture by increasing a frame capture rate for the receiver 502. The receiver 502 may have a base frame capture rate (e.g., 15 fps, 30 fps, 33 fps, etc.). The base frame capture rate may be fixed, or the device 500 may adjust the base frame capture rate based on, e.g., one or more operations in the image processing pipeline for the device 500. For example, if the device is slowed in processing frames from the receiver 502, the device 500 may decrease the base frame capture rate to compensate.

In some example implementations of decreasing the exposure time, the device 500 may increase the frame capture rate for the receiver 502 (such as from a base frame capture rate). In some aspects, the device 500 may increase the frame capture rate to an integer multiple of the base frame capture rate based on at least one accumulation statistic. As an example, the receiver 502 may have a base frame capture rate of 15 fps. The receiver 502 captures a frame approximately every 67 ms at the base frame capture rate, and the exposure time for each frame capture is less than 67 ms. If the receiver 502 increases the frame capture rate from 15 fps (the base frame capture rate) to, e.g., 30 fps (an integer multiple of the base frame capture rate) based on at least one accumulation statistic, the exposure time for each frame capture is less than approximately 33 ms. In some other examples, the exposure time may be adjusted without adjusting the frame capture rate of the receiver 502.

With a shorter exposure time (such as based on a higher frame capture rate), the receiver sensor is less likely to be saturated during frame capture. However, the determined difference between the received light with and without reflections of the light distribution is smaller when the exposure time is decreased. Referring back to FIGS. 4A and 4B, the difference between lines 406 and 408 or lines 456 and 458 decrease when moving left (reducing the exposure time 402 or 452) in the graph 400 or 450, respectively.

In some example implementations, the device 500 may increase the differences in measured overall light intensities with and without the light distribution reflection by aggregating the measured light intensities across multiple frames. In this manner, the device 500 may compensate for decreasing the exposure time (such as based on the frame capture rate). Aggregated light intensities may be used in generating the aggregated frame (such as described above regarding FIG. 6B), and the device may use the aggregated frame for active depth sensing (such as in generating a depth map). While the examples of aggregating the measured light intensities for an aggregated frame are described below regarding increasing the frame capture rate, the measure light intensities may be aggregated without increasing the frame capture rate, and the present disclosure should not be limited to the following examples.

Figure 8:
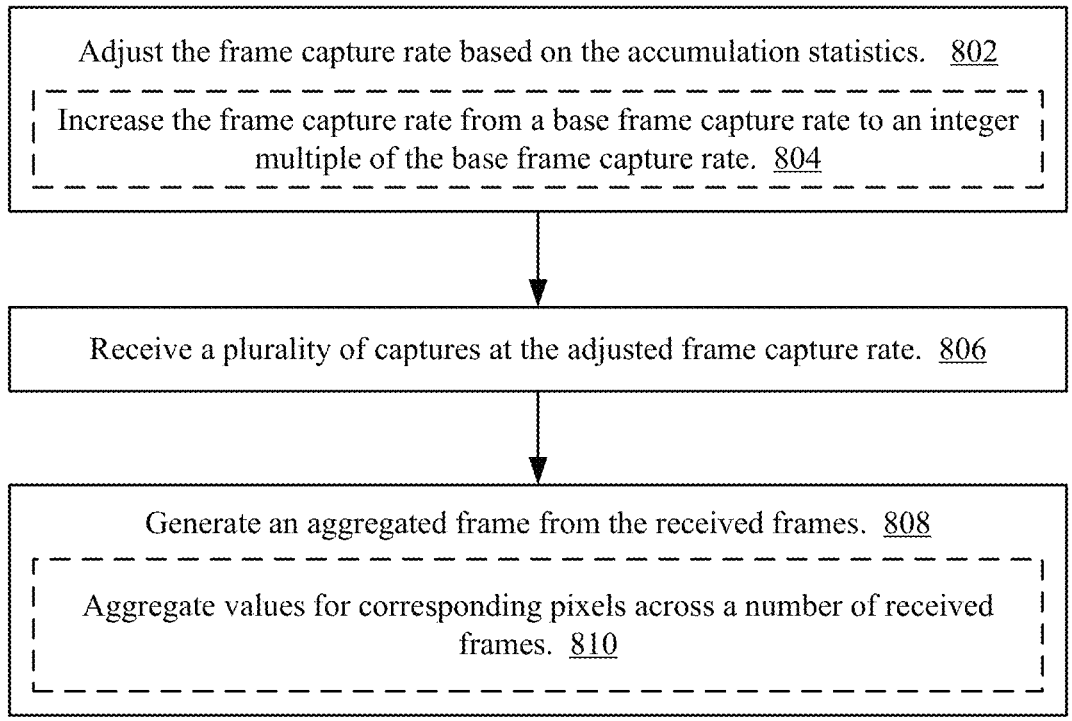
FIG. 8 is an illustrative flow chart depicting an example operation for generating an aggregated frame based on an increased frame capture rate.

FIG. 8 is an illustrative flow chart depicting an example operation 800 for generating an aggregated frame based on an increased frame capture rate. The aggregated frame may include aggregated measured light intensities across multiple frames based on an adjusted frame capture rate. Beginning at 802, the device 500 may adjust the frame capture rate of the receiver 502 based on the accumulation statistics. In some example implementations, the device 500 may increase the frame capture rate from a base frame capture rate to an integer multiple of the base frame capture rate (804). In some instances, the current frame capture rate already may be an integer multiple (greater than one) of the base frame capture rate. The device 500 thus may decrease the frame capture rate to a lower integer multiple of the base frame capture rate (including the base frame capture rate itself), or the device 500 may increase the frame capture rate to a higher integer multiple of the base frame capture rate.

After adjusting the frame capture rate, the device 500 may receive a plurality of frame captures from the receiver 502 using the adjusted frame capture rate (806), and the device 500 may generate an aggregated frame from the received frames (808). In some example implementations, the device 500 may aggregate values for a corresponding pixel across a number of received frames (810). For example, the device 500 may stack the number of received frames. The number of received frames for which to aggregate (stack) may be the integer multiple number of the base frame capture rate. In one example, if the base frame capture rate is 15 fps and the current frame capture rate is 30 fps, the number of received frames to aggregate may be 2 (since the current frame capture rate is 2× the base frame capture rate). In another example, if the current frame capture rate is 60 fps, the number of received frames to aggregate may be 4 (since the current frame capture rate is 4× the base frame capture rate). While the examples describe aggregating a number of frames equal to an integer multiple of the base frame capture rate, the device 500 may aggregate any number of frames. Further, the frame capture rate may be a non-integer multiple of the base frame capture rate, and the present disclosure should not be limited to specific multiples or specific frame capture rates in generating an aggregated frame.

If the generated aggregated frame includes an aggregated number of frames equal to the integer multiple of the base frame capture rate for the current frame capture rate, the rate of aggregated frames (generated by the device 500) may be the same as the base frame capture rate. For example, if the base frame capture rate is 30 fps, the current frame capture rate is 90 fps, and each aggregated frame includes 3 frame captures (at the current frame capture rate), the periodicity of aggregated frames may equal the base frame capture rate.

In some example implementations, the total (aggregated) exposure time of the receiver sensor across the captured frames aggregated for an aggregate frame may be approximately equal to the exposure time of the receiver sensor for a frame at the base frame capture rate. In this manner, any thresholds that may be used in determining to adjust the frame capture rate may be used independent of the frame capture rate. Further, the device 500 may treat the aggregated frame the same as a frame captured at the base frame capture rate in performing active depth sensing. In this manner, the device 500 may not need to perform any calculations or conversions in using aggregated frames instead of captured frames (at the base frame capture rate) for active depth sensing or frame capture rate adjustment. In some other example implementations, the device 500 may adjust the active depth sensing operations or the frame capture rate adjustment operations based on the frame capture rate or the type of aggregated frame generated.

Figure 9:
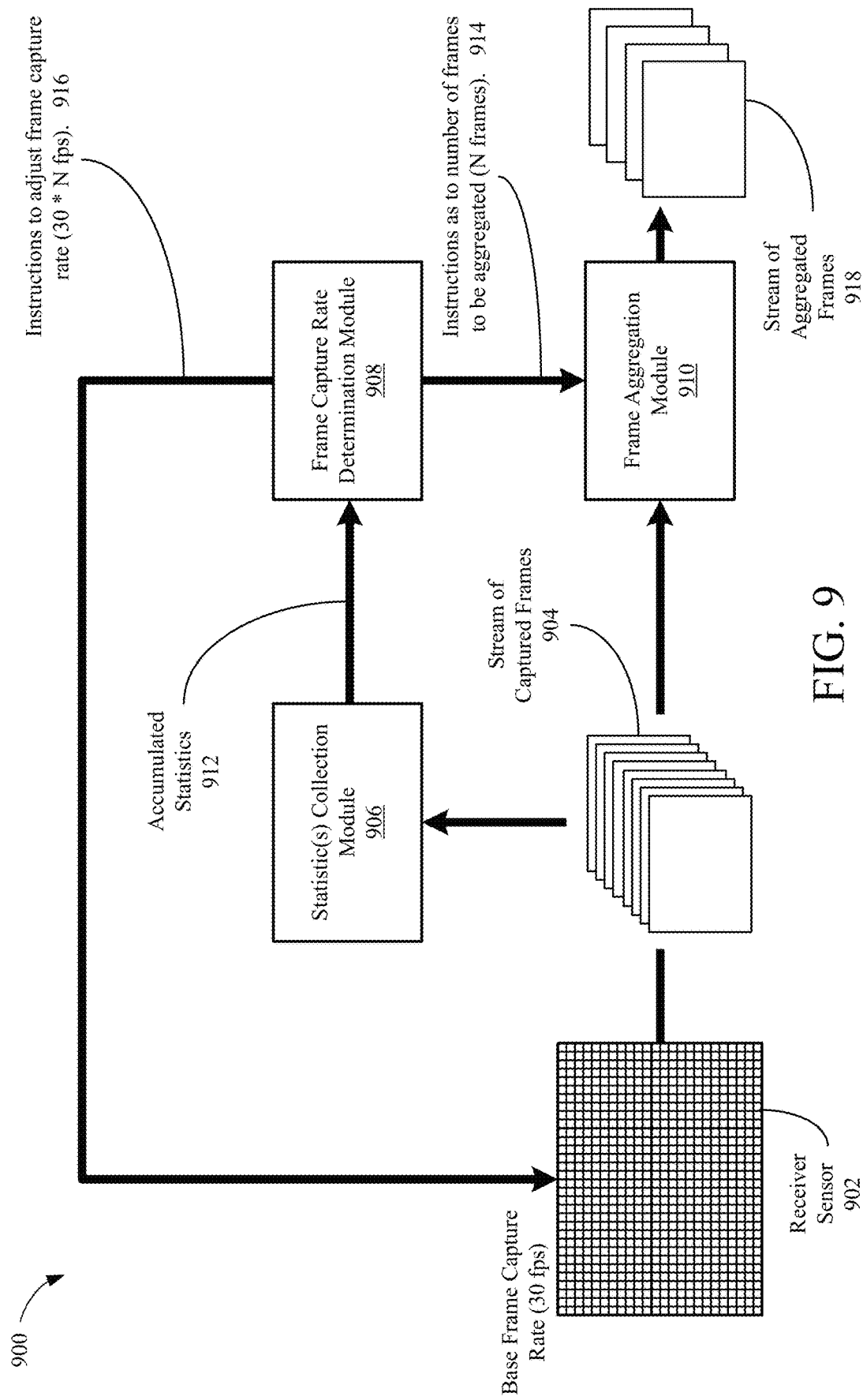
FIG. 9 is a block diagram of example components for generating aggregated frames.

FIG. 9 is a block diagram 900 of example components for generating aggregated frames. The sensor 902 from receiver 502 may be a NIR sensor with a base frame capture rate of 30 fps. The sensor 902 may provide to the device 500 a stream of captured frames 904 at a rate of 30 fps. The device 500 may include a statistic(s) collection module 906 to determine and accumulate one or more statistics to be used for determining a frame capture rate for the sensor 902. The accumulated statistics 912 may be received by the frame capture rate determination module 908, and the frame capture rate determination module 908 may use the statistics 912 to determine whether to adjust the frame capture rate of the sensor 902 and how much to adjust the frame capture rate. For example, the module 908 may compare the statistics 912 to one or more thresholds (such as a saturation threshold, intensity threshold, or other suitable threshold) to determine whether and how much to adjust the frame capture rate of the sensor 902. If the module 908 determines that the frame capture rate is to be adjusted, the module 908 may send instructions 916 for adjusting the frame capture rate. The instructions 916 may indicate a multiple N (where N is an integer equal to or greater than 1) of the base frame capture rate. The instructions 916 may be received by the receiver 502 or a controller controlling the receiver 502 (such as the camera controller 510) to adjust the frame capture rate of the sensor 902 to N times the base frame capture rate (such as 30N where 30 fps is the base frame capture rate). The determination module 908 also may send instructions 914 as to the number of frames to be aggregated to a frame aggregation module 910. For example, the determination module 908 may send instructions to the aggregation module 910 to aggregate N number of frames. The aggregation module 910 may aggregate (such as stack) a consecutive N number of frames from the stream of capture frames 904 based on the instructions 914, and the aggregation module 910 may generate a stream of aggregated frames 918. The stream of aggregated frames 918 may be at a rate equal to the base frame capture rate of the sensor 902 (such as 30 fps for a base frame capture rate of 30 fps).

Determining and accumulating statistics, determining to adjust the frame capture rate, instructing to adjust the frame capture rate, and generating aggregated frames (such as modules 906, 908, and 910 in FIG. 9) may be performed, e.g., by the camera controller 510 (such as the image signal processor 512), the processor 504, and/or other suitable components of the device 500. The operations may be embodied in the instructions 508 stored in the memory 506 (or another suitable memory of the device 500) and executed by a processor, may be performed using dedicated hardware (such as in the image signal processor 512 or the processor 504), or may be performed using a combination of hardware and software.

In addition to determining the number of captured frames to aggregate in generating an aggregated frame, the device 500 may determine which captured frames to aggregate for an aggregated frame. In the above example for FIG. 9, the device 500 may aggregate N consecutive frames (where N is the integer multiple of the base frame capture rate for the current frame capture rate).

In some example implementations, the device may synchronize which captured frames from the receiver 502 to aggregate based on image frame captures from a camera. Referring back to FIG. 5, the device 500 may include or be coupled to a camera 522. The camera 522 may include an image sensor, such as an RGB sensor, for capturing images using the received visible light. The receiver 502 (which may receive NIR) may assist the camera 522 (which may receive visible light). In one example, NIR measurements from the receiver 502 may be used in helping determine a focal length for the camera 522. In another example, NIR measurements from the receiver 502 may be used in color balancing a captured image frame from the camera 522 in low light scenarios. If the receiver 502 and the camera 522 are to operate concurrently, the device 500 may be configured to synchronize frame capture of the receiver 502 with image frame capture of the camera 522. In some example implementations, the camera controller 510 may synchronize the frame captures of the receiver 502 and the camera 522. In some other example implementations, the processor 504 or another suitable component of the device 500 may synchronize the frame captures of the receiver 502 and the camera 522. The present disclosure should not be limited to a specific component or combination of components performing the example operations for synchronizing frame captures.

The receiver 502 may be operating at a frame capture rate greater than the frame capture rate of the camera 522. In synchronizing captures from the receiver 502 and the camera 522, the device 500 may synchronize the timing of multiple exposure windows of the receiver 502 sensor to the timing of the exposure window of the camera 522 image sensor. The camera 522 may have a global shutter (where all pixels of the image sensor are scanned at the same time) or a rolling shutter (where the pixels of the image sensor are scanned sequentially).

Figure 10:
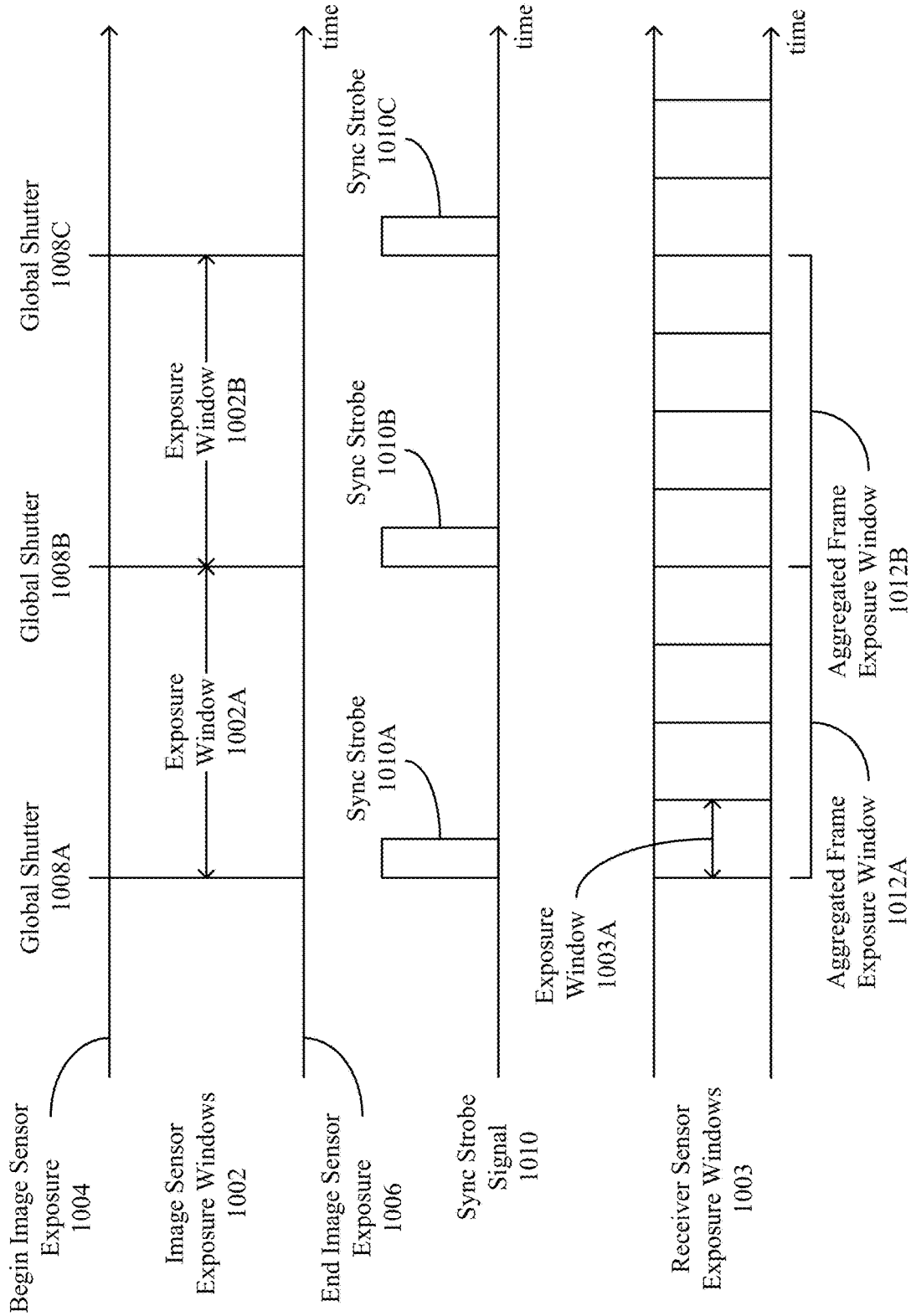
FIG. 10 is a depiction of synchronizing structured light receiver sensor exposure windows with image sensor exposure windows for a camera with a global shutter.

FIG. 10 is a depiction of synchronizing receiver 502 sensor exposure windows 1003 with image sensor exposure windows 1002 for the receiver 502 and the camera 522 of the device 500. Begin image sensor exposure 1004 is a timing illustration when the first pixels of the image sensor begin (or end) being exposed for frame capture. End image sensor exposure 1006 is a timing illustration when the last pixels of the image sensor begin (or end) being exposed for image frame capture. Global shutter 1008A, 1008B, and 1008C indicate when the image sensor pixels are scanned for capturing an image frame (thus indicating the end of the previous exposure window). For example, global shutter 1008B indicates an end of the exposure window 1002A, and global shutter 1008C indicates an end of the exposure window 1002B. While there may exist an amount of time between ending an exposure window of the image sensor for a first image frame and beginning an exposure window of the image sensor for a next image frame, FIG. 10 illustrates an end of the exposure window 1002A and illustrates a beginning of the exposure window 1002B as occurring at the same time (at global shutter 1008B) for example purposes.

The camera 522 may provide a synchronization (sync) strobe signal 1010 indicating when the shutter for the image sensor is used. In this manner, the device 500 may know the end of the exposure window for a captured frame. For example, sync strobe 1010A may indicate when global shutter 1008A occurs, sync strobe 1010B may indicate when global shutter 1008B occurs, and sync strobe 1010C may indicate when global shutter 1008C occurs. For a global shutter, the end of the exposure window is at the same time for all pixels of the image sensor (as indicated by vertical lines for the global shutter 1008A-1008C).

The device 500 may know the length of the exposure windows for the image sensor based on the type of camera 522 and other device configurations. Using the known length of the exposure window, the device 500 may use the sync strobe signal 1010 to synchronize the timing of frame captures (or the exposure times) for the receiver 502. For example, the device 500 may use the sync strobe 1010A to align the exposure window 1003A with the exposure window 1002A of the image sensor (by adjusting the start of the exposure window 1003). The device 500 may determine the number of captured frames for the receiver 502 corresponding to an exposure window of the image sensor for the camera 522 based on the known length of the exposure window. In the example in FIG. 10, the device 500 may determine to aggregate 4 consecutive frames corresponding to 4 exposure windows 1003 to generate an aggregated frame (based on the length of the exposure window and the timing of the shutter for the image sensor of the camera 522). In this manner, the aggregated frame exposure window 1012A (for a first aggregated frame) corresponds to the exposure window 1002A, and the aggregated frame exposure window 1012B (for a second aggregated frame) corresponds to the exposure window 1002B. In some example implementations, the base frame capture rate of the receiver 502 may be equal to the image frame capture rate of the camera 522.

While the provided example in FIG. 10 illustrates an integer multiple of exposure windows 1003 occurring during the exposure windows 1002, the exposure windows 1002 and 1003 may not align as illustrated. In some example implementations, the device 500 may determine the exposure windows 1003 most aligned with an exposure window 1002. For example, if 3.5 exposure windows 1003 occur during an exposure window 1002, the device 500 may use three or four exposure windows 1003 for an aggregated frame. In some other example implementations, the device 500 may delay frame captures by the receiver 502 to align a beginning of an exposure window 1003 with a beginning of an exposure window 1004. Any other suitable alignment techniques may be used, and the present disclosure should not be limited to the provided examples.

Figure 11:
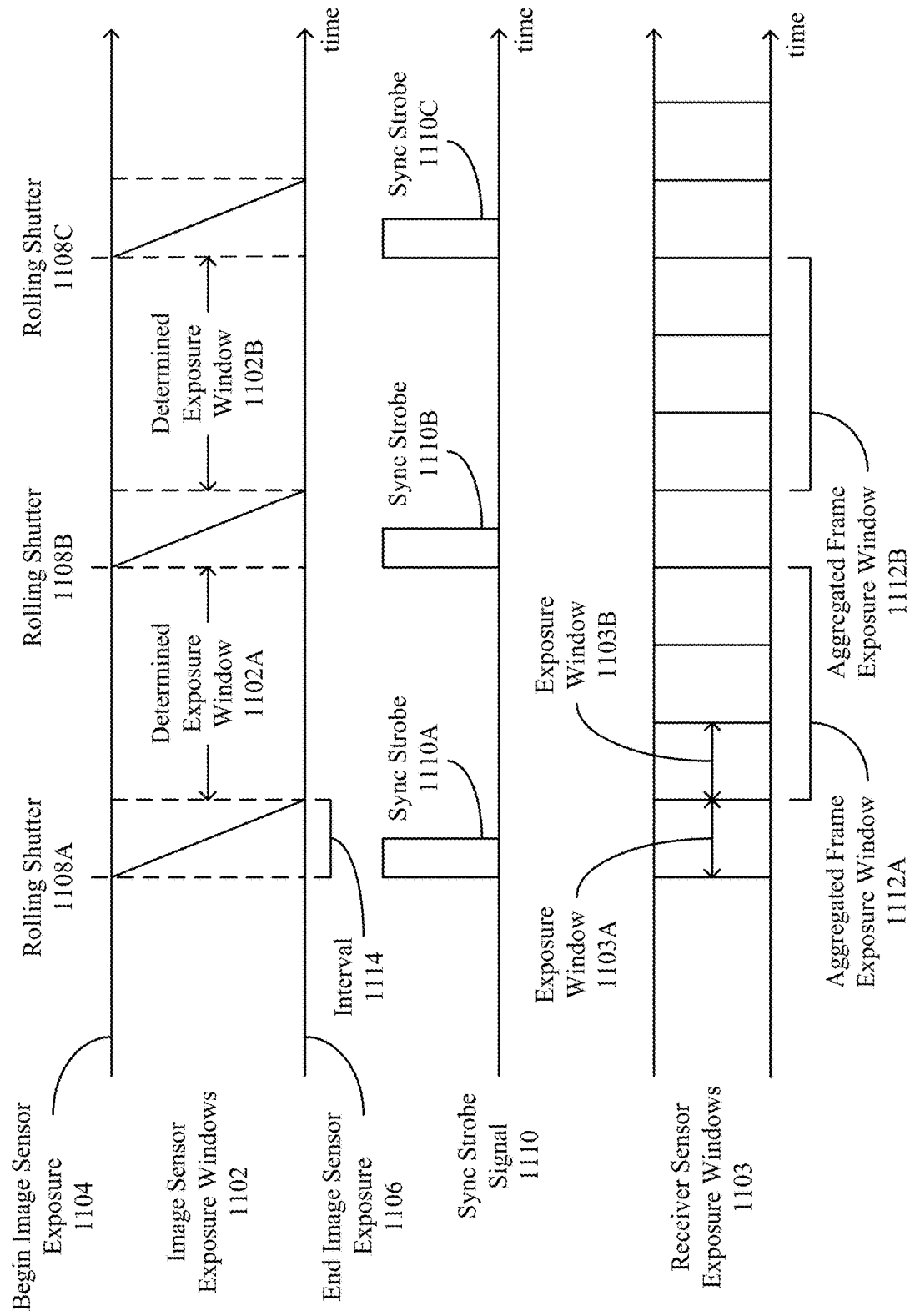
FIG. 11 is a depiction of synchronizing structured light receiver sensor exposure windows with image sensor exposure windows for a camera with a rolling shutter.

Alternative to a global shutter, the camera 522 may include a rolling shutter. As a result, the timing of an exposure window may differ for different image sensor pixels of the camera 522 when capturing an image frame. FIG. 11 is a depiction of synchronizing sensor exposure windows 1103 for the receiver 502 with image sensor exposure windows 1102 for the camera 522 with a rolling shutter. Begin image sensor exposure 1104 is a timing illustration when the first pixels of the image sensor begin (or end) being exposed for frame capture. End image sensor exposure 1106 is a timing illustration when the last pixels of the image sensor begin (or end) being exposed for image frame capture. Since the camera 522 includes a rolling shutter for FIG. 11, the lines for rolling shutter 1108A, 1108B, and 1108C are slanted to indicate when the image sensor pixels are scanned for capturing an image frame (with the first pixels being scanned before the last pixels). For example, rolling shutter 1108B indicates an end of an exposure window, which differs for different pixels of the image sensor, that corresponds to a determined exposure window 1102A. The rolling shutter 1108C indicates an end of an exposure window that corresponds to a determined exposure window 1102B. The time from beginning to end of scanning for a rolling shutter may be known or determined based on the camera 522 and the device 500.

For an image sensor exposure window 1102, one or more pixels of the image sensor may not be exposed during an end of the exposure window, such as illustrated by interval 1114, when the pixels of the image sensor are being scanned. For example, the exposure window for the first pixels scanned may end before the exposure window for the last pixels scanned from the image sensor. The scan time for the image sensor using a rolling shutter (such as indicated by interval 1114) may be known or determined by the device 500 based on the camera 522. For example, the camera 522 may have a pixel scan rate of its image sensor, and the scan time may be the number of pixels of the image sensor divided by the pixel scan rate.

Similar to the example in FIG. 10 regarding a global shutter, the camera 522 may provide a sync strobe signal 1110 indicating when the rolling shutter for the image sensor begins (when the pixels of the image sensor begin to be scanned for an image frame). Sync strobe 1110A may indicate when rolling shutter 1108A begins, sync strobe 1110B may indicate when rolling shutter 1108B begins, and sync strobe 1110C may indicate when rolling shutter 1108C begins.

The device 500 may determine the portion of the exposure when all pixels of the image sensor are exposed (such as illustrated by the determined exposure windows 1102A and 1102B, where the interval (such as interval 1114) during the rolling shutters 1108A, 1108B, and 1108C are removed from the corresponding exposure windows 1102. In some example implementations, the device 500 may synchronize the receiver sensor exposure windows 1103 to the determined exposure windows of the image sensor (e.g., excluding the intervals during the rolling shutter). The device 500 thus may exclude receiver sensor exposure windows 1103 occurring during a rolling shutter or outside of a determined exposure window (excluding the time interval for the rolling shutter) for the image sensor.

For example, in FIG. 11, the device 500 may align the beginning of the exposure window 1103B with the beginning of the determined exposure window 1102A. In this manner, the device 500 may exclude the exposure window 1103A from being used for the aggregated frame corresponding to the exposure window 1112A (and the previous aggregated frame). The exposure window 1112B for the aggregated frame corresponds to the determined exposure window 1102B, and the aggregated frames for the receiver 502 each include 3 captured frames and exclude 1 captured frame. In the example in FIG. 11, the time for the rolling shutter approximately equals one exposure window for the receiver 502. However, the rolling shutter may take a longer or shorter amount of time.

While the provided example in FIG. 11 illustrates an integer multiple of exposure windows 1103 occurring during the determined exposure windows 1102A-1102B, the exposure windows may not align as illustrated. In some example implementations, the device 500 may determine the exposure windows 1103 most aligned with the determined exposure window 1102A. For example, the device 500 may exclude any exposure windows of the receiver 502 with any beginning portion of the exposure window during the rolling shutter of the camera 522. In some other example implementations, the device 500 may delay frame captures by the receiver 502 to align a beginning of an exposure window 1103 with a beginning of a determined exposure window 1102 (excluding the intervals during a rolling shutter). Any other suitable alignment techniques may be used, and the present disclosure should not be limited to the provided examples.

In some example implementations, the device 500 may use the sync strobe signal to determine when to start collecting captured frames from the receiver 502 for a frame of the camera 522. For example, the device 500 may begin collecting (for aggregation) frames captured at or after receipt of the sync strobe for the image frame. If the camera 522 includes a rolling shutter, the device 500 may begin collecting frames (for aggregation) after the known time interval for scanning from the sync strobe (such as interval 1114 after sync strobe 1110A before beginning to collect frames from the receiver 502 for aggregation). In this manner, the frame captures of the receiver 502 may be synchronized to the image frames of the camera 522, ensuring that the scene information in the aggregated frame corresponds to the scene information in the captured image frame. While a sync strobe signal 1010 and 1110 is described for the above examples, any suitable signal or indication of a shutter for the camera 522 may be used, and the present disclosure should not be limited to use of a sync strobe signal.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 506 in the example device 500 of FIG. 5) comprising instructions 508 that, when executed by the processor 504 (or the camera controller 510 or the image signal processor 512), cause the device 500 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 504 or the image signal processor 512 in the example device 500 of FIG. 5. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the structured light system is described as using NIR, signals at other frequencies may be used, such as microwaves, other infrared, ultraviolet, and visible light. In another example, while the examples describe automatically adjusting the exposure time based on an amount of ambient light, the device 500 may adjust the exposure time based on a user input. For example, the user may input an instruction to increase the frame capture rate for the receiver 502 because of the number of errors or omissions in a depth map for the scene, and the device 500 may adjust the frame capture rate and aggregated frames for the receiver 502 based on the user input. In a further example, the receiver 502 may have a maximum frame capture rate at which the device 500 does not increase the rate (even if saturation or other statistics indicate an increase in the frame capture rate). For example, the maximum rate may be a physical limitation of the receiver 502 or correspond to a maximum processing speed of the device 500.

Additionally, the functions, steps or actions of the method claims in accordance with aspects described herein need not be performed in any particular order unless expressly stated otherwise. For example, the steps of the described example operations, if performed by the device 500, the camera controller 510, the processor 504, and/or the image signal processor 512, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for active depth sensing, comprising:
    determining an amount of ambient light for a scene to be captured by a structured light receiver;
    adjusting a frame capture rate of the structured light receiver, wherein the adjusted frame capture rate comprises increasing the frame capture rate from a base frame capture rate to an integer multiple of the base frame rate;
    adjusting an exposure time for frame capture of a sensor of the structured light receiver based on the determined amount of ambient light, wherein the exposure time of the sensor of the structured light receiver is inversely related to the determined amount of ambient light and wherein the adjusted exposure time is based on the adjusted frame capture rate;
    receiving a plurality of captured frames from the structured light receiver based on the adjusted exposure time, wherein each of the plurality of captured frames includes a plurality of pixels having a pixel value;
    for each pixel, aggregating the pixel values across the plurality of captured frames;
    generating an aggregated frame, including the aggregated pixel values; and
    generating a depth map based on the aggregated frame.

2. The method of claim 1, wherein:
    aggregating the pixel values includes aggregating across a consecutive number of received frames captured at the increased frame capture rate, wherein the number of received frames in generating the aggregated frame is equal to the integer multiple of the base frame capture rate.

3. The method of claim 1, further comprising synchronizing frame captures from the structured light receiver with image frame captures from a camera configured to measure visible light.

4. The method of claim 3, wherein synchronizing frame captures and image frame captures comprises:
    determining a beginning of an exposure window for an image frame capture from the camera, wherein a length of the exposure window is known;
    determining the exposure windows, of the frame captures from the structured light receiver, after the beginning of the exposure window and during the exposure window of the image frame capture from the camera;
    receiving captured frames from the structured light receiver for the determined exposure windows; and
    generating an aggregated frame by aggregating the received captured frames.

5. The method of claim 4, further comprising:
    excluding a portion of the exposure window for the image frame capture during a rolling shutter in determining the exposure windows of the frame captures from the structured light receiver; and
    excluding, from being aggregated in generating the aggregated frame, one or more received captured frames from the structured light receiver with an exposure window during the rolling shutter for the image frame capture.

6. The method of claim 1, wherein determining an amount of ambient light comprises at least one from the group consisting of:
    determining a saturation statistic across one or more captured frames from the structured light receiver;
    determining an intensity statistic across one or more captured frames from the structured light receiver;
    determining a decoding error statistic across one or more captured frames from the structured light receiver; and
    determining a signal-to-noise ratio statistic across one or more captured frames from the structured light receiver.

7. A device for active depth sensing, comprising:
    a structured light receiver,
    a memory; and
    a processor coupled to the memory and configured to:
        determine an amount of ambient light for a scene to be captured by a structured light receiver;
        adjust a frame capture rate of the structured light receiver, wherein the adjusted frame capture rate comprises increasing the frame capture rate from a base frame capture rate to an integer multiple of the base frame capture rate;
        adjust an exposure time for frame capture of a sensor of the structured light receiver based on the determined amount of ambient light, wherein the exposure time of the sensor of the structured light receiver is inversely related to the determined amount of ambient light and wherein the adjusted exposure time is based on the adjusted frame capture rate;

receive a plurality of captured frames from the structured light receiver based on the adjusted exposure time, wherein each of the plurality of captured frames includes a plurality of pixels having a pixel value;

for each pixel, aggregate the pixel values across the plurality of captured frames;

generate an aggregated frame, including the aggregated pixel values; and generate a depth map based on the aggregated frame.

8. The device of claim 7, wherein the structured light receiver is configured to capture frames at the increased frame capture rate, and wherein the processor, in aggregating the pixel values, is configured to:

aggregate across a consecutive number of received frames captured at the increased frame capture rate, wherein the number of received frames in generating the aggregated frame is equal to the integer multiple of the base frame capture rate.

9. The device of claim 7, further comprising a camera configured to capture image frames in a visible light spectrum, wherein the processor is further configured to synchronize frame captures from the structured light receiver with image frame captures from the camera.

10. The device of claim 9, wherein the processor, in synchronizing frame captures and image frame captures, is configured to:

determine a beginning of an exposure window for an image frame capture from the camera, wherein a length of the exposure window is known;

determine the exposure windows, of the frame captures from the structured light receiver, after the beginning of the exposure window and during the exposure window of the image frame capture from the camera;

receive captured frames from the structured light receiver for the determined exposure windows; and generate an aggregated frame by aggregating the received captured frames.

11. The device of claim 10, wherein the processor is further configured to:

exclude a portion of the exposure window for the image frame capture during a rolling shutter in determining the exposure windows of the frame captures from the structured light receiver; and exclude, from being aggregated in generating the aggregated frame, one or more received captured frames from the structured light receiver with an exposure window during the rolling shutter for the image frame capture.

12. The device of claim 7, wherein the processor, in determining an amount of ambient light, is configured to determine at least one from the group consisting of:

a saturation statistic across one or more captured frames from the structured light receiver;

an intensity statistic across one or more captured frames from the structured light receiver;

a decoding error statistic across one or more captured frames from the structured light receiver; and a signal-to-noise ratio statistic across one or more captured frames from the structured light receiver.

13. A non-transitory computer-readable medium storing one or more programs containing instructions that, when executed by one or more processors of a device, cause the device to:

determine an amount of ambient light for a scene to be captured by a structured light receiver;

increase a frame capture rate of the structured light receiver from a base frame capture rate to an integer multiple of the base frame capture rate, adjust an exposure time for frame capture of a sensor of the structured light receiver based on the determined amount of ambient light, wherein the exposure time of the sensor of the structured light receiver is inversely related to the determined amount of ambient light and wherein the adjusted exposure time is based on the adjusted frame capture rate;

receive a plurality of captured frames from the structured light receiver based on the adjusted exposure time, wherein each of the plurality of captured frames includes a plurality of pixels having a pixel value;

for each pixel, aggregate the pixel values across the plurality of captured frames;

generate an aggregated frame, including the aggregated pixel values; and generate a depth map based on the aggregated frame.

14. The computer-readable medium of claim 13, wherein the instructions for aggregating the pixel values cause the device to:

aggregate across a consecutive number of received frames captured at the increased frame capture rate, wherein the number of received frames in generating the aggregated frame is equal to the integer multiple of the base frame capture rate.

15. The computer-readable medium of claim 13, wherein the instructions further cause the device to synchronize frame captures from the structured light receiver with image frame captures from a camera configured to measure visible light.

16. The computer-readable medium of claim 15, wherein the instructions for synchronizing frame captures and image frame captures cause the device to:

determine a beginning of an exposure window for an image frame capture from the camera, wherein a length of the exposure window is known;

determine the exposure windows, of the frame captures from the structured light receiver, after the beginning of the exposure window and during the exposure window of the image frame capture from the camera;

receive captured frames from the structured light receiver for the determined exposure windows; and generate an aggregated frame by aggregating the received captured frames.

17. The computer-readable medium of claim 16, wherein the instructions further cause the device to:

exclude a portion of the exposure window for the image frame capture during a rolling shutter in determining the exposure windows of the frame captures from the structured light receiver; and exclude, from being aggregated in generating the aggregated frame, one or more received captured frames from the structured light receiver with an exposure window during the rolling shutter for the image frame capture.

18. The computer-readable medium of claim 13, wherein the instructions for determining an amount of ambient light cause the device to determine at least one from the group consisting of:

a saturation statistic across one or more captured frames from the structured light receiver;

an intensity statistic across one or more captured frames from the structured light receiver;

a decoding error statistic across one or more captured frames from the structured light receiver; and a signal-to-noise ratio statistic across one or more captured frames from the structured light receiver.

19. A device for active depth sensing, comprising:
means for determining an amount of ambient light for a scene to be captured by a structured light receiver;
means for increasing a frame capture rate of the structured light receiver from a base frame capture rate to an integer multiple of the base frame capture rate;
means for adjusting an exposure time for frame capture of a sensor of the structured light receiver based on the determined amount of ambient light, wherein the exposure time of the sensor of the structured light receiver is inversely related to the determined amount of ambient light wherein the adjusted exposure time is based on the adjusted frame capture rate;
means for receiving a plurality of captured frames from the structured light receiver based on the adjusted exposure time, wherein each of the plurality of captured frames includes a plurality of pixels having a pixel value;
means for aggregating, for each pixel, the pixel values across the plurality of captured frames;
means for generating an aggregated frame including the aggregated pixel values and
means for generating a depth map based on the aggregated frame.

20. The device of claim 19, wherein the means for aggregating the pixel values is configured to:
aggregate across a consecutive number of received frames captured at the increased frame capture rate, wherein the number of received frames in generating the aggregated frame is equal to the integer multiple of the base frame capture rate.

21. The device of claim 19, further comprising means for synchronizing frame captures from the structured light receiver with image frame captures from a camera configured to measure visible light.

22. The device of claim 21, further comprising:
means for determining a beginning of an exposure window for an image frame capture from the camera, wherein a length of the exposure window is known;
means for determining the exposure windows, of the frame captures from the structured light receiver, after the beginning of the exposure window and during the exposure window of the image frame capture from the camera;
means for receiving captured frames from the structured light receiver for the determined exposure windows; and
means for generating an aggregated frame by aggregating the received captured frames.

23. The device of claim 22, further comprising:
means for excluding a portion of the exposure window for the image frame capture during a rolling shutter in determining the exposure windows of the frame captures from the structured light receiver; and
means for excluding, from being aggregated in generating the aggregated frame, one or more received captured frames from the structured light receiver with an exposure window during the rolling shutter for the image frame capture.

24. The device of claim 19, wherein an amount of ambient light includes at least one from the group consisting of:
a saturation statistic across one or more captured frames from the structured light receiver;
an intensity statistic across one or more captured frames from the structured light receiver;
a decoding error statistic across one or more captured frames from the structured light receiver; and
a signal-to-noise ratio statistic across one or more captured frames from the structured light receiver.

25. The method of claim 1, further comprising:
decreasing the frame capture rate to a lower integer multiple of the base frame capture rate.

* * * * *